US009987942B2

(12) United States Patent
Lee et al.

(10) Patent No.: US 9,987,942 B2
(45) Date of Patent: Jun. 5, 2018

(54) METHOD OF OPERATING VEHICLE POWERTRAIN BASED ON PREDICTION OF HOW DIFFERENT CHEMICAL TYPE BATTERIES CONNECTED IN PARALLEL WILL OPERATE TO OUTPUT DEMANDED CURRENT

(71) Applicant: Ford Global Technologies, LLC, Dearborn, MI (US)

(72) Inventors: Tae-Kyung Lee, Ann Arbor, MI (US); Bruce Carvell Blakemore, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 14/475,966

(22) Filed: Sep. 3, 2014

(65) Prior Publication Data
US 2016/0059728 A1    Mar. 3, 2016

(51) Int. Cl.
*B60L 11/14*    (2006.01)
*B60L 11/18*    (2006.01)

(52) U.S. Cl.
CPC ....... *B60L 11/1861* (2013.01); *B60L 11/1864* (2013.01); *B60L 2240/545* (2013.01); *B60L 2240/549* (2013.01); *Y02T 10/7005* (2013.01); *Y02T 10/7044* (2013.01); *Y02T 10/7061* (2013.01)

(58) Field of Classification Search
CPC ......... B60L 3/12; H01M 10/465; Y02T 10/48
See application file for complete search history.

(56) References Cited

U.S. PATENT DOCUMENTS

| | | | |
|---|---|---|---|
| 6,441,586 B1* | 8/2002 | Tate et al. ...................... | 320/132 |
| 7,208,914 B2 | 4/2007 | Klang | |
| 7,564,221 B2* | 7/2009 | Asai ................... | G01R 31/3651 320/132 |
| 8,975,897 B2* | 3/2015 | Yoshioka ........... | G01R 31/3651 320/132 |
| 2007/0069692 A1* | 3/2007 | Melichar ...................... | 320/128 |
| 2007/0299620 A1 | 12/2007 | Yun et al. | |
| 2008/0007224 A1* | 1/2008 | Melichar ............ | G01R 31/3624 320/132 |
| 2009/0058367 A1* | 3/2009 | Naik ................... | G01R 31/3648 320/136 |
| 2010/0052618 A1* | 3/2010 | Inoue ................... | G01R 31/361 320/134 |
| 2012/0326726 A1* | 12/2012 | Tabuchi ............. | G01R 31/3648 324/434 |
| 2013/0141045 A1* | 6/2013 | Karim et al. ................. | 320/110 |
| 2014/0239914 A1* | 8/2014 | Igarashi et al. ............... | 320/134 |
| 2015/0202966 A1* | 7/2015 | Oyama ................. | B60L 3/0046 701/22 |
| 2015/0219724 A1* | 8/2015 | Gibbs ................ | G01R 31/3624 324/426 |
| 2016/0216336 A1* | 7/2016 | Ishii ...................... | H02J 7/0021 |

* cited by examiner

*Primary Examiner* — Eduardo Santana
*Assistant Examiner* — Charles S Laughlin
(74) *Attorney, Agent, or Firm* — David B. Kelley; Brooks Kushman P.C.

(57) ABSTRACT

A powertrain having a battery system including at least two batteries of different chemical types connected in parallel is operated according to predicted responses of the batteries to a demanded current command for the battery system to output a demanded current. The battery responses are predicted directly from the demanded current using a backward-looking model of the battery system.

8 Claims, 6 Drawing Sheets

FIG. 4F

METHOD OF OPERATING VEHICLE POWERTRAIN BASED ON PREDICTION OF HOW DIFFERENT CHEMICAL TYPE BATTERIES CONNECTED IN PARALLEL WILL OPERATE TO OUTPUT DEMANDED CURRENT

TECHNICAL FIELD

The present disclosure relates to predicting how the batteries of a battery system of an electric vehicle including different chemical types of batteries connected in parallel will operate for the battery system to output a demanded current.

BACKGROUND

An electric vehicle includes a traction battery system. Certain traction battery systems include batteries connected in parallel with one another. In some of these battery systems, the batteries are of different chemical types from one another. For instance, a traction battery system may have two different chemical type batteries connected in parallel with one of the batteries being a lead-acid battery and another battery being a lithium-ion (Li-ion) battery. The batteries have different dynamic characteristics and impedances due to the different chemistries. It may be advantageous to predict the responses of the batteries to a demanded current to be outputted by the battery system.

SUMMARY

In embodiments, methods for predicting how the batteries (i.e., battery packs) of a traction battery system including parallel connected batteries of different chemical types will operate for the battery system to output a demanded current are provided. The prediction includes how the batteries will respond (i.e., the battery responses) to a demanded current command for the battery system to output a demanded current. That is, the operation of the batteries which will cause the battery system to output a demanded current is predicted. Put another way, operation of the battery system responsive to a demanded current to be outputted by the battery system is predicted.

The methods include processes to predict the battery responses with consideration of battery internal impedance and state of charge (SOC) dynamics in real time. The methods include processes to represent power electronics that assign current demands from a battery system controller to the batteries. The predicted battery responses include SOC dynamics, open circuit voltage (OCV) changes, internal resistance changes, battery output currents, and battery terminal voltage responses.

In an embodiment, a method for a powertrain having a battery system including at least two batteries of different chemical types connected in parallel is provided. The method includes operating the powertrain according to predicted responses of the batteries to a demanded current command for the battery system to output a demanded current. The battery responses are predicted directly from the demanded current using a backward-looking model of the battery system.

In an embodiment, a system for a powertrain including a battery assembly having at least two batteries of different chemical types connected in parallel is provided. The system includes a controller. The controller is configured to operate the powertrain according to predicted responses of the batteries to a demanded current command for the battery assembly to output a demanded current, and to predict the battery responses directly from the demanded current using a backward-looking model based on state of charge (SOC) dynamics of each of the batteries of the battery assembly.

In an embodiment, a powertrain having a battery system and a controller is provided. The battery system includes at least two batteries of different chemical types connected in parallel. The controller is configured to: use a backward-looking model of the battery system to predict battery responses including internal impedance and state of charge dynamics of each of the batteries in response to a demanded current command for the battery system to output a demanded current; use the predicted battery responses to predict an output current of each of the batteries which together provide the demanded current; and operate the powertrain according to the predicted output currents of the batteries.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
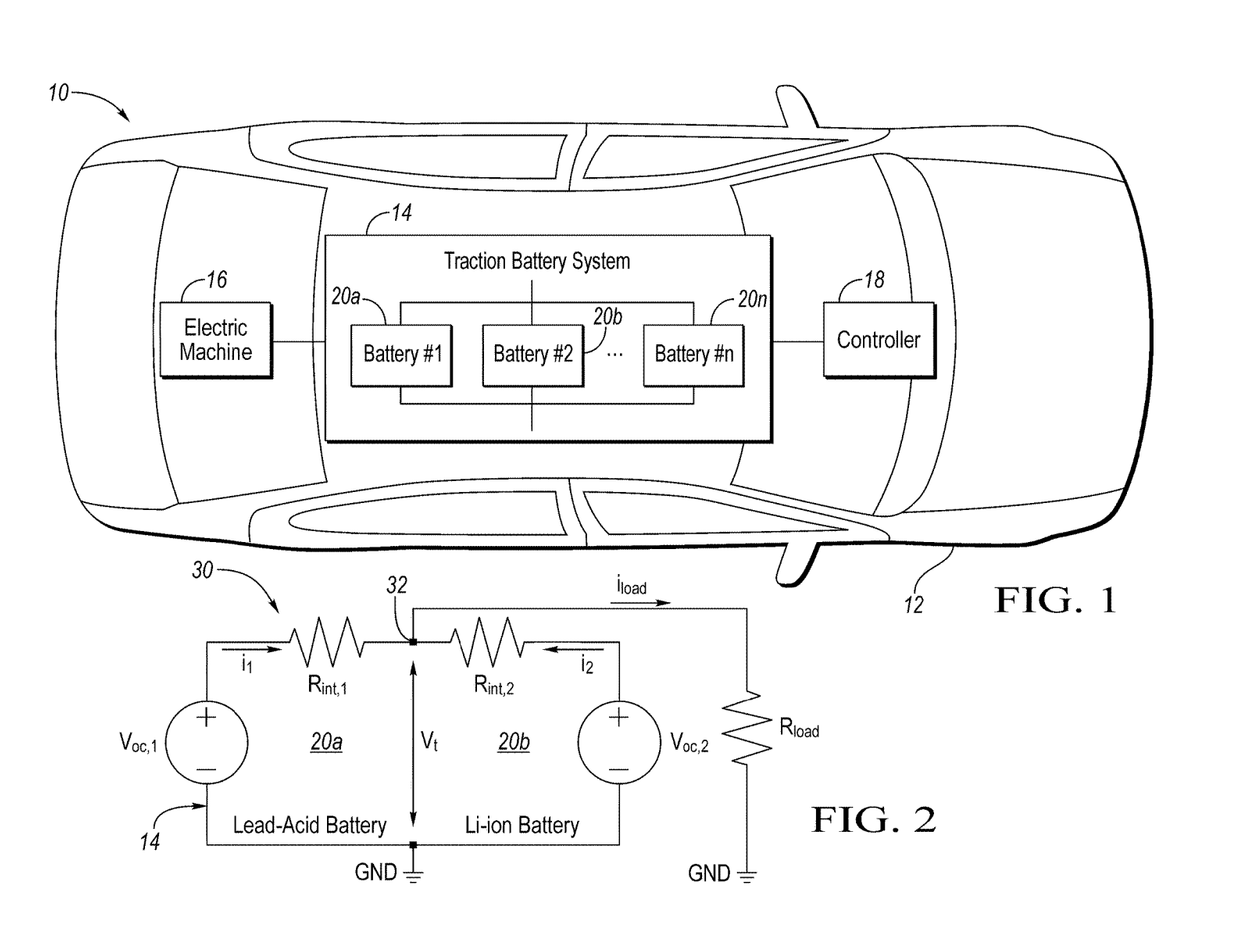
FIG. 1 illustrates a block diagram of a powertrain of an electric vehicle in accordance with an embodiment of the present invention.
FIG. 2 illustrates an internal resistance type equivalent circuit model representative of the traction battery system of the powertrain of the electric vehicle.

Referring now to FIG. 1, a block diagram of a powertrain 10 of an electric vehicle 12 in accordance with an embodiment of the present invention is shown. Powertrain 10 includes a traction battery system (or assembly) 14, an electric machine 16 such as a motor/generator, and a controller 18. Battery system 14 is configured to provide electrical power to motor 16. Motor 16 converts the electrical power into motive power for propelling vehicle 12.

Battery system 14 includes a plurality of batteries (i.e., battery packs) 20 (20a, 20b . . . 20n). Batteries 20 are connected in parallel with one another. At least two of batteries 20 are of different chemical types from one another. For instance, battery 20a is a lead-acid battery and battery 20b is a lithium-ion (Li-ion) battery. If battery system 14 includes another battery such as battery 20n, then battery 20n may be a lead-acid battery, a Li-ion battery, or a battery of some other chemical type. The batteries of different chemical types including batteries 20a and 20b have different dynamic characteristics and impedances due to their different chemistries. For simplicity, unless otherwise indicated, it will be assumed that battery system 14 includes just lead-acid battery 20a and Li-ion battery 20b.

Controller 18 is configured to monitor and control the operation of battery system 14. In operation, controller 18 provides a demanded current command to battery system 14. Battery system 14 is to output the demanded current to motor 16 in response to the demanded current command. Batteries 20 operate together to cause battery system 14 to output the demanded current.

Controller 18 is further configured to carry out a method for predicting how batteries 20 will operate to cause battery system 14 to output the demanded current. That is, controller 18 is further configured to predict how batteries 20 will respond (i.e., the responses of batteries 20) to the demanded current command to cause battery system 14 to output the demanded current. Batteries 20 have different dynamic responses from one another as the batteries have different chemistries. The responses of each battery 20 include state of charge (SOC) dynamics, open circuit voltage (OCV) changes, internal resistance changes, battery output currents, and battery terminal voltage responses.

Controller 18 can carry out processes to predict the battery responses with consideration of battery internal impedance and SOC dynamics in real time and to represent power electronics that assign current demands from the controller to batteries 20. Controller 18 can thereby predict the SOC dynamics, OCV changes, internal resistance changes, battery output currents, and battery terminal voltage responses for each battery 20. In turn, controller 18 can use this information to better control the operation of powertrain 10.

Referring now to FIG. 2, an internal resistance type equivalent circuit model 30 representative of traction battery system 14 is shown. The operation of controller 18 in predicting how batteries 20 will operate to cause battery system 14 to output the demanded current will be demonstrated using model 30. However, it is noted that the prediction operation is not limited to using such models.

Model 30 includes one portion which represents lead-acid battery 20a and another portion which represents Li-ion battery 20b. Batteries 20 are connected in parallel with one another between terminal voltage point 32 and ground (Gnd). Battery 20a includes a voltage source $V_{OC,1}$ (OCV of the lead acid-battery), an electric current $i_1$ (current of the lead-acid battery), and an internal impedance $R_{int,1}$ (internal impedance of the lead acid-battery). Similarly, battery 20b includes a voltage source $V_{OC,2}$ (OCV of the Li-ion battery), an electric current $i_2$ (current of the Li-ion battery), and an internal impedance $R_{int,2}$ (internal impedance of the Li-ion battery). Voltage $V_t$ of battery system 14 is at terminal voltage point 32 relative to ground. Voltage $V_t$ of battery system 14 is the output voltage of the battery system.

The internal impedance $R_{int,1}$ of battery 20a is a function of the SOC, temperature, and usage profile and other state variables of battery 20a. Likewise, the internal impedance $R_{int,2}$ of battery 20b is a function of the SOC, temperature, and usage profile and other state variables of battery 20b. The internal impedances $R_{int,1}$ and $R_{int,2}$ can be replaced by internal impedances capable of capturing battery dynamics.

Model 30 further includes adjustable load impedance $R_{load}$. Load impedance $R_{load}$ is connected between terminal voltage point 32 and ground. The adjustability of load impedance $R_{load}$ represents the operation of controller 18 in providing a demanded current command to battery system 14. Load impedance $R_{load}$ is adjusted to provide a demanded current command to battery system 14. The demanded current command depends on the value of load impedance $R_{load}$, as well as the value of the output voltage $V_t$ of battery system 14. Therefore, adjusting load impedance $R_{load}$ to a given value causes a corresponding demanded current command. For instance, adjusting load impedance $R_{load}$ to an impedance value of the battery system, accounting for the first impedance value and the second impedance value, causes a demanded current command for current having an amperage value of the system.

Model 30 further includes a load current $i_{load}$. The load current $i_{load}$ is the demanded current that battery system 14 is to output. Battery system 14 outputs the load current $i_{load}$ from terminal voltage point 32. As such, the load current $i_{load}$ corresponds to the demanded current command provided by adjusting load impedance $R_{load}$ to a given impedance value. The load current $i_{load}$ corresponds to the demanded current command as the value of the load current $i_{load}$ depends on the value of load impedance $R_{load}$, as well as the value of the output voltage $V_t$ of battery system 14.

As described, the operation of controller 18 in providing a demanded current command to battery system 14 is depicted in model 30 with load impedance $R_{load}$ and load current $i_{load}$. Given a demanded current command corresponding to load current $i_{load}$, battery system 14 is to output the load current $i_{load}$. Batteries 20 will thereby operate for battery system 14 to output load current $i_{load}$. However, due to batteries 20 having different dynamic characteristics and impedances due to their different chemistries, the batteries will operate differently from one another for battery system 14 to output load current $i_{load}$. That is, batteries 20 will have different dynamic responses to the demanded current command due to their different chemistries. As previously noted, the battery responses include SOC dynamics, OCV changes, internal resistance changes, battery output currents, and battery terminal voltage responses. The operation of controller 18 includes predicting these responses of batteries 20 and thereby predicting how batteries 20 will respond to the demanded current command for battery system 14 to output load current $i_{load}$. As will be described in further detail below, this prediction takes into consideration internal impedances and SOC dynamics of batteries 20.

Model 30 provides a backward-looking modeling approach employed by controller 18 in predicting the battery responses. The backward-looking modeling approach is constructed for computational efficiency as controller 18 computes system responses (i.e., battery responses of batteries 20) from the output of the system (i.e., load current $i_{load}$) backward to determine the inputs (i.e., battery terminal voltage $V_t$ of battery system 14, current $i_1$ of battery 20a, and current $i_2$ of battery 20b). As such, when load current $i_{load}$ is given, output currents $i_1$ and $i_2$ of batteries 20 are computed concurrently. That is, the inputs (i.e., battery terminal voltage $V_t$ of battery system 14, current $i_1$ of battery 20a, and current $i_2$ of battery 20b) which will result in the demanded current output (i.e., load current $i_{load}$) are determined from the system responses. The system responses thereby provide the formulas for determining the inputs which will result in the demanded current output.

As described, the prediction operation employs a novel approach to assign load current $i_{load}$ to model 30 of battery system 14 and to predict battery terminal voltage $V_t$ of the battery system and currents $i_1$ and $i_2$ of batteries 20. Controller 18 is represented by adjustable load impedance $R_{load}$. The output current of battery system 14, and thereby currents $i_1$ and $i_2$ of batteries 20, are controlled through adjusting load impedance $R_{load}$.

As described in greater detail herein, the battery terminal voltage $V_t$ is directly determined from load current $i_{load}$ using load impedance $R_{load}$, which is also determined from load current $i_{load}$. The battery terminal voltage $V_t$ and load impedance $R_{load}$ are predicted from load current $i_{load}$ without iterative computation. (Such iterative computation entails continuously adjusting load impedance $R_{load}$ until the desired load current $i_{load}$ is obtained.) The SOC dynamics of battery system 14 are predicted with the consideration of dynamics of each battery 20.

The operation of controller 18 in predicting how batteries 20 will operate to cause battery system 14 to output a demanded current include: 1) SOC dynamics calculation; 2) electric circuit response calculation; 3) terminal voltage prediction; and 4) battery current prediction.

With reference to model 30 shown in FIG. 2, the SOC of batteries 20a and 20b is calculated using the following equations (1) and (2), respectively:

$$SOC_1(t) = SOC_{1,0} + \frac{1}{Q_{batt,1}} \int_0^t i_1(\tau) d\tau \qquad (1)$$

$$SOC_2(t) = SOC_{2,0} + \frac{1}{Q_{batt,2}} \int_0^t i_2(\tau) d\tau \qquad (2)$$

$SOC_1(t)$ is the SOC for battery 20a, $SOC_{1,0}$ is the initial SOC of battery 20a, $Q_{batt,1}$ is the capacity of battery 20a, and $i_1$ is the current of battery 20a. $SOC_2(t)$ is the SOC for battery 20b, $SOC_{2,0}$ is the initial SOC of battery 20b, $Q_{batt,2}$ is the capacity of battery 20b, and $i_2$ is the current of battery 20b. The capacities $Q_{batt,1}$ and $Q_{batt,2}$ of batteries 20a and 20b, respectively, are obtained offline from a battery capacity table having such information. The battery capacity table includes capacity values for a plurality of batteries of different chemical types.

The electric circuit responses are calculated using the following equations (3), (4a), (4b), (5a), (5b), and (6):

$$i_{load} = i_1 + i_2 \qquad (3)$$

$$V_{OC,1} = f_1(SOC_1) \qquad (4a)$$

$$V_{OC,2} = f_2(SOC_2) \qquad (4a)$$

$$V_{OC,1} - (R_{int,1} \times i_1) = V_t \qquad (5a)$$

$$V_{OC,2} - (R_{int,2} \times i_2) = V_t \qquad (5b)$$

$$R_{load} \times i_{load} = V_t \qquad (6)$$

For completeness, $i_{load}$ is the load current, $i_1$ is the current of battery 20a, $i_2$ is the current of battery 20b, $V_{OC,1}$ is the open circuit voltage of battery 20a, $V_{OC,2}$ is the open circuit voltage of battery 20b, $R_{int,1}$ is the internal impedance of battery 20a, $R_{int,2}$ is the internal impedance of battery 20b, $V_t$ is the output voltage of battery system 14, and $R_{load}$ is the adjustable impedance load.

Internal impedance $R_{int,1}$ of battery 20a is a function of $SOC_1(t)$ of battery 20a and the temperature of battery 20a. Internal impedance $R_{int,2}$ is a function of $SOC_2(t)$ of battery 20b and the temperature of battery 20b. Internal impedances $R_{int,1}$ and $R_{int,2}$ are obtained offline from a battery internal impedance table having such information. The battery impedance table includes internal impedance values for a plurality of batteries of different chemical types as a function of the battery SOC and battery temperature.

The battery terminal voltage $V_t$ is calculated using the following equations (7) and (8):

$$R_{load} = \left[\frac{1}{i_{load}}\left(\frac{V_{OC,1}}{R_{0,1}} + \frac{V_{OC,2}}{R_{0,2}}\right) - 1\right] / \left[\frac{1}{R_{0,1}} + \frac{1}{R_{0,2}}\right] \qquad (7)$$

Equation (7) is derived from equations (3), (5a), (5b), and (6).

$$V_t = R_{load} i_{load} = \left[\left(\frac{V_{OC,1}}{R_{0,1}} + \frac{V_{OC,2}}{R_{0,2}}\right) - i_{load}\right] / \left[\frac{1}{R_{0,1}} + \frac{1}{R_{0,2}}\right] \qquad (8)$$

The currents $i_1$ and $i_2$ of battery 20a and battery 20b, respectively, are predicted from the calculated battery terminal voltage $V_t$ using the following equations (9a) and (9b):

$$i_1 = \frac{V_{OC,1} - V_t}{R_{0,1}} \qquad (9a)$$

$$i_2 = \frac{V_{OC,2} - V_t}{R_{0,2}} \qquad (9b)$$

As described, the SOC dynamics of batteries 20a and 20b are modeled using equations (1) and (2). Output voltage $V_t$ is computed using equations (5a), (5b), and (6). Open circuit voltages of batteries 20a and 20b are expressed as equations (4a) and (4b). An intermediate parameter $R_{load}$, which is introduced to assign the battery current commanded by controller 18, is computed by equation (7). Battery system terminal voltage $V_t$ is predicted by equation (8). Currents $i_1$ and $i_2$ of batteries 20a and 20b are predicted by equations (9a) and (9b). Through equations (1) to (9), the battery dynamics responses including SOC dynamics, voltage and current dynamics are predicted in battery system 14 having two different chemical type batteries 20 connected in parallel.

In summary, the output voltage $V_t$ and the output currents $i_1$ and $i_2$ from batteries 20a, 20b are computed directly from the demanded current command (i.e., the commanded current output $i_{load}$ of battery system 14).

Figure 3:
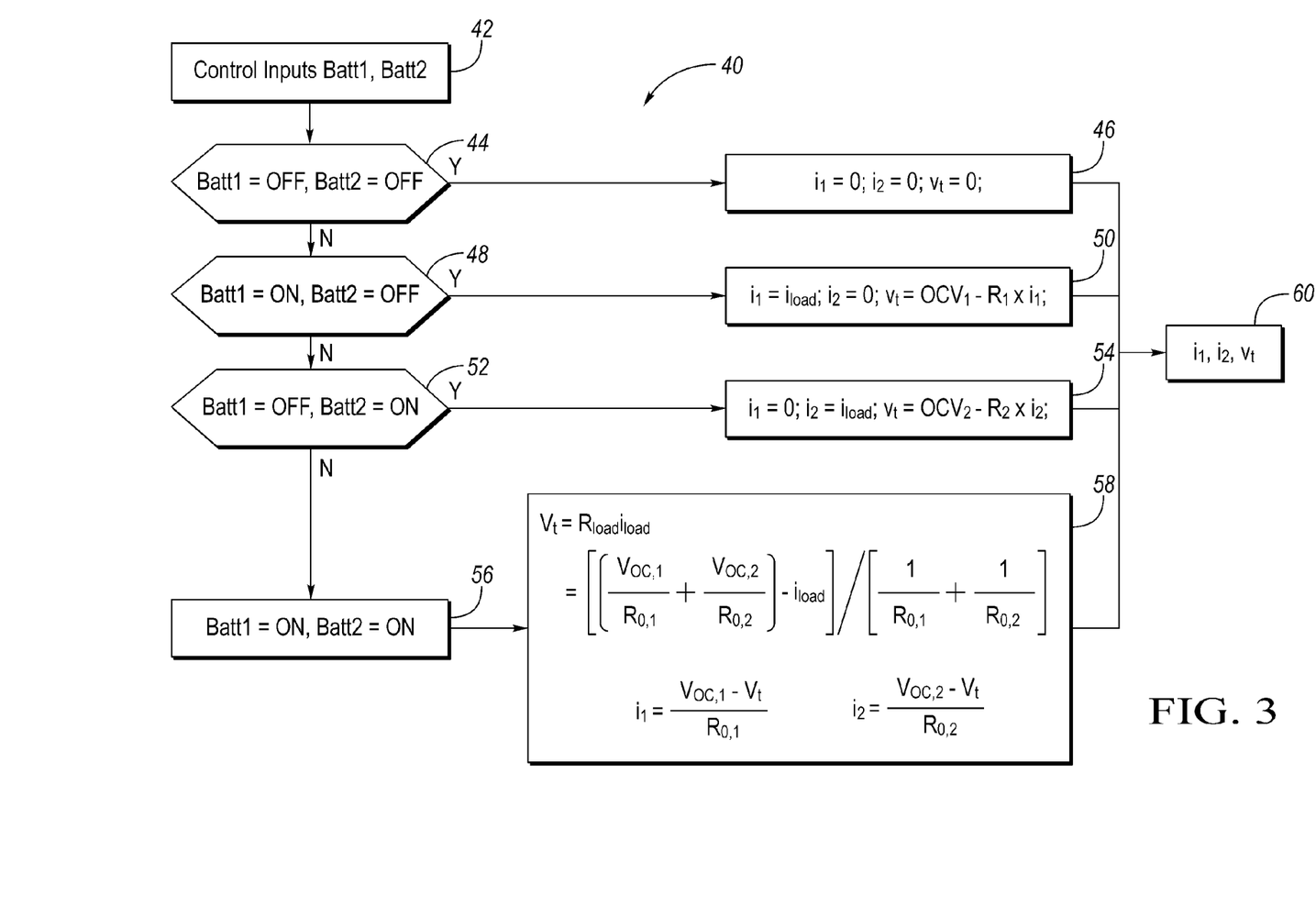
FIG. 3 illustrates a flowchart depicting operation of a method for predicting the output currents of the batteries of the traction battery system and the output voltage of the traction battery system.

Referring now to FIG. 3, a flowchart 40 depicting operation of a method for predicting output currents $i_1$ and $i_2$ of batteries 20a, 20b of battery system 14 and output voltage $V_t$ of the battery system is shown. The operation begins with setting control inputs $B_{att1}$ and $B_{att2}$ as indicated in block 42. Control inputs $B_{att1}$ and $B_{att2}$ respectively correspond to batteries 20a and 20b. If battery 20a is off and battery 20b is off at decision block 44, then output current $i_1=0$, output current $i_2=0$, and output voltage $V_t=0$ as indicated in block 46. If battery 20a is on and battery 20b is off at decision block 48, then output current $i_1=i_{load}$, output current $i_2=0$, and output voltage $V_t=V_{OC,1}-(R_{int,1}\times i_1)$ as indicated in block 50. If battery 20a is off and battery 20b is on at decision block 52, then output current $i_1=0$, output current $i_2=i_{load}$, and output voltage $V_t=V_{OC,2}-(R_{int,2}\times i_2)$ as indicated in block 54. If both of batteries 20a and 20b are on as indicated in block 56, then the method calculates output currents $i_1$ and $i_2$ and output voltage $V_t$ using the equations (8), (9a), and (9b) as indicated in block 58. The calculated values of output currents $i_1$ and $i_2$ and output voltage $V_t$ are outputted as indicated in block 60. These outputted values may be used, for instance, as part of the overall management of traction system 10.

Figure 4A:
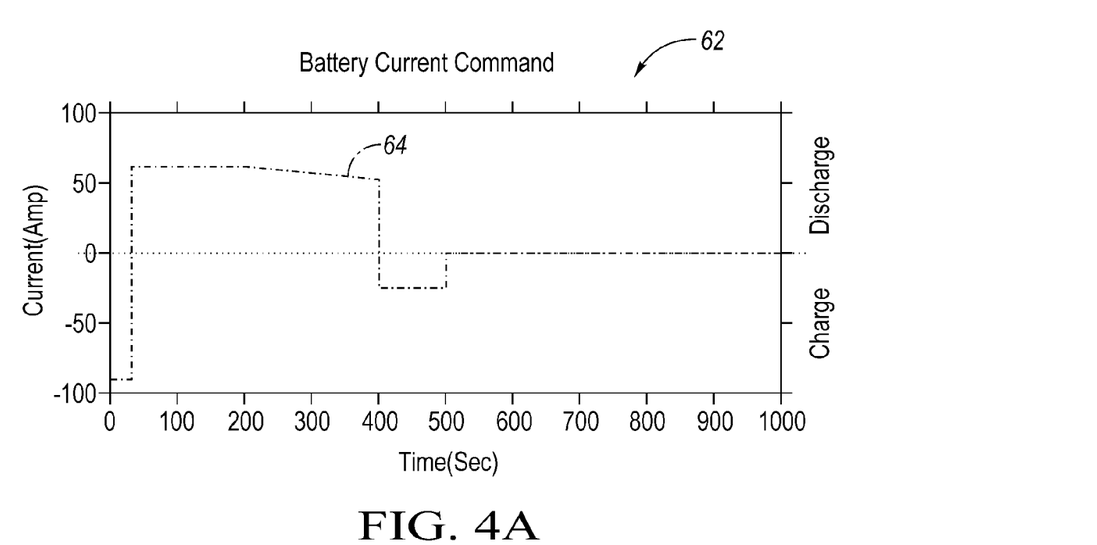
FIGS. 4A through 4F illustrate various graphs demonstrating an example of operation of the traction battery system including responses of the batteries of the traction battery system to a demanded current command.
Figure 4B:
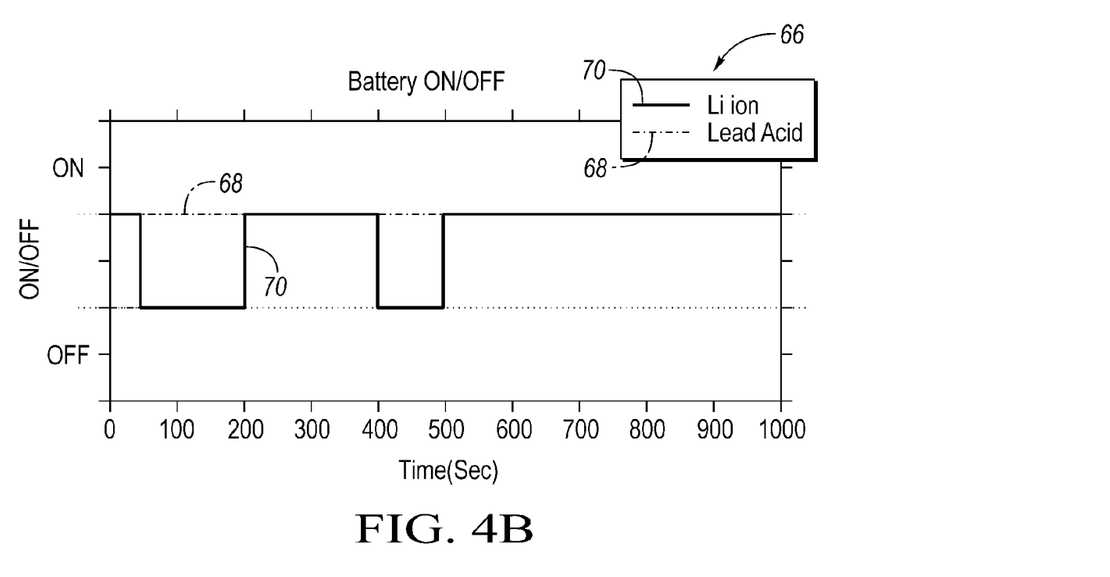
Figure 4C:
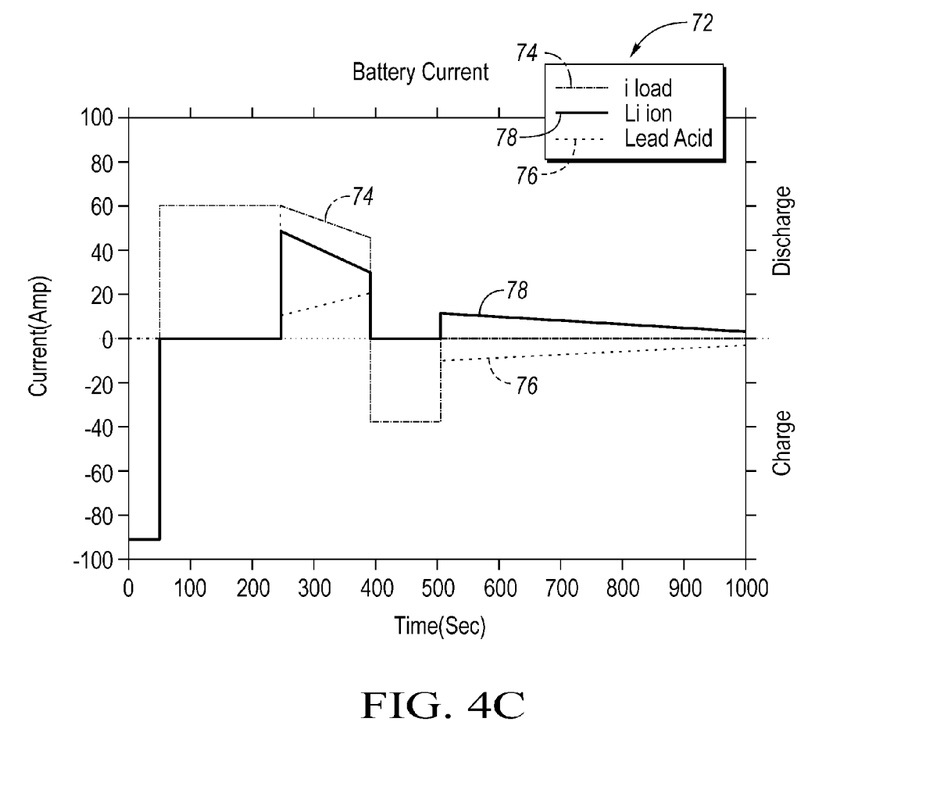
Figure 4D:
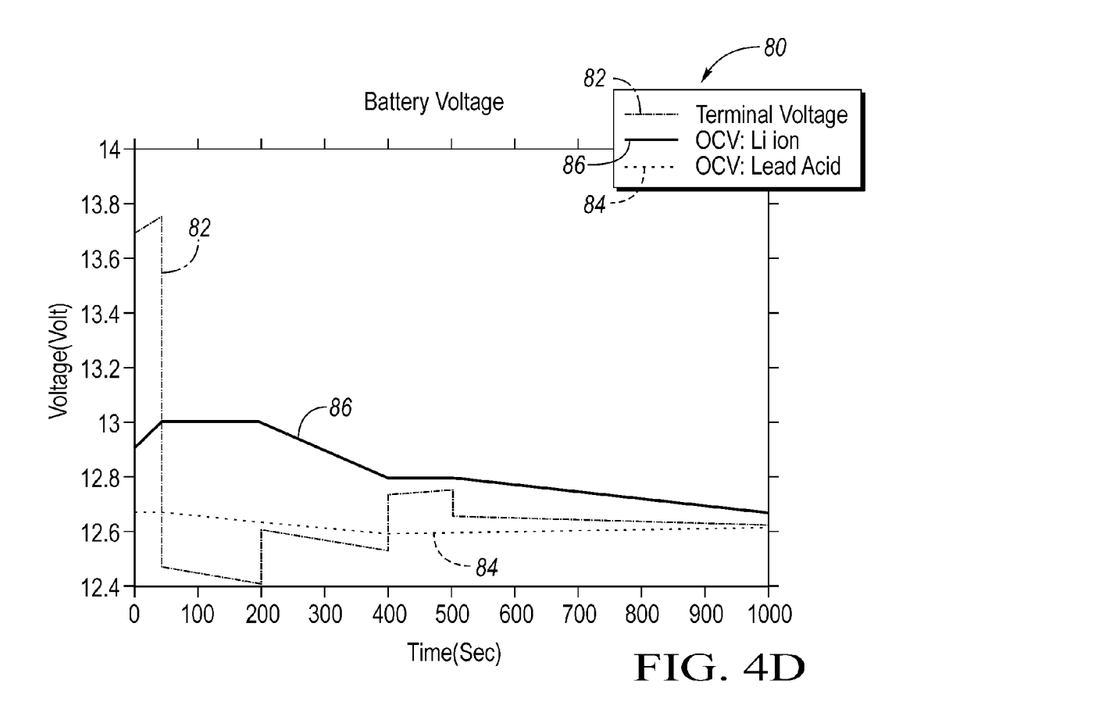
Figure 4E:
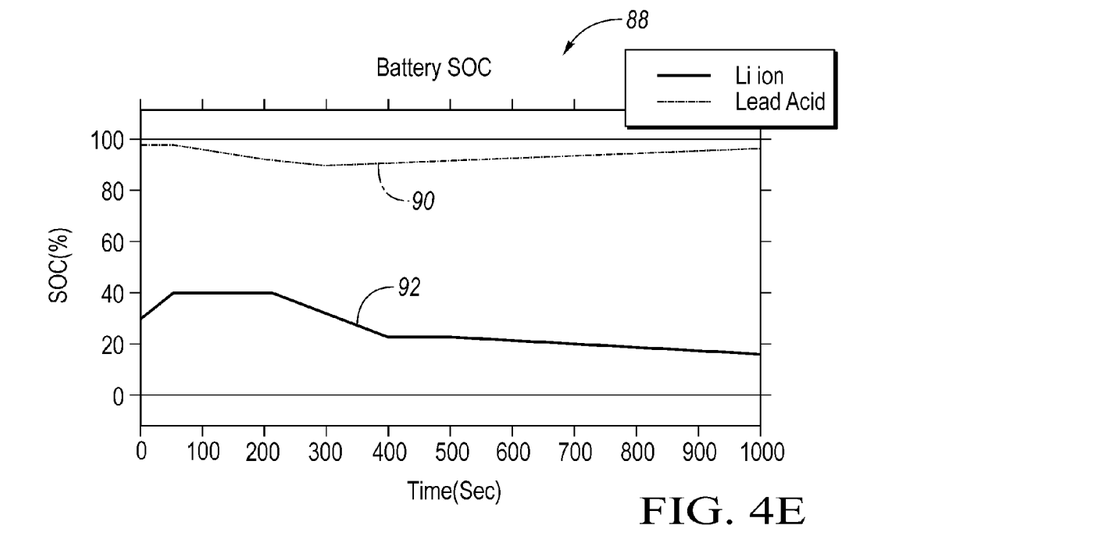
Figure 4F:
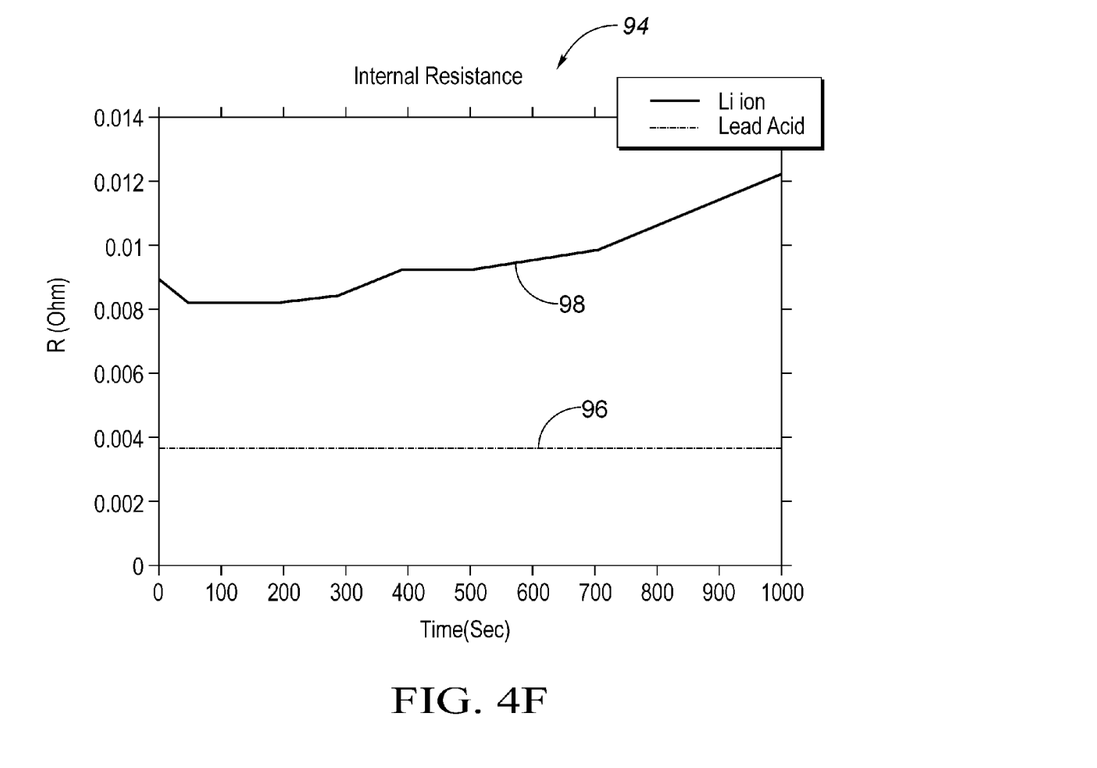

Referring now to FIGS. 4A through 4F, with continual reference to FIG. 2, various graphs demonstrating one example of operation of battery system 14 including the responses of batteries 20 to a demanded current command are shown. FIG. 4A illustrates a graph 62 of the demanded current command over time. Graph 62 includes a plot 64 of an exemplary demanded current command over time. FIG. 4B illustrates a graph 66 of the battery on/off status over time. Graph 66 includes a plot 68 of the on/off status of battery 20a and a plot 70 of the on/off status of battery 20b. FIG. 4C illustrates a graph 72 of battery current over time. Graph 72 includes a plot 74 of load current $i_{load}$, a plot 76 of output current $i_1$ of battery 20a, and a plot 78 of output current $i_2$ of battery 20b. As described herein, output currents $i_1$ and $i_2$ are predicted responses of battery system 14 in response to the demanded current $i_{load}$. FIG. 4D illustrates a graph 80 of battery voltage over time. Graph 80 includes a plot 82 of the output voltage $V_t$ of battery system 14, a plot 84 of the open circuit voltage of battery 20a, and a plot 86 of the open circuit voltage of battery 20b. FIG. 4E illustrates a graph 88 of the battery SOC over time. Graph 88 includes a plot 90 of the SOC of battery 20a and a plot 92 of the SOC of battery 20b. FIG. 4F illustrates a graph 94 of the internal battery resistance over time. Graph 94 includes a plot 96 of internal impedance $R_{int,1}$ of battery 20a and a plot 98 of internal impedance $R_{int,2}$ of battery 20b.

As described, methods for predicting how the batteries of a traction battery system including parallel connected batteries of different chemical types will operate for the battery system to output a demanded current are provided. A feature is the introduction of $R_{load}$ to compute the battery system terminal voltage $V_t$, which enables the direct prediction of battery responses to a commanded battery current from controller 18.

The methods include the following advantages, features, and/or characteristics. The methods include an analytical methodology to predict the responses of a battery system with two or more different chemical type batteries connected in parallel. The methods are relatively not complicated in being able to predict the battery responses. As such, the methods are practical to be implemented in a traction battery system controller of an electric vehicle. That is, the methods can operate fast enough to be implemented in a battery management system. The methods may also be used for vehicle simulation to develop battery system management strategies. The methods predict the battery responses with the balance of computational efficiency and accuracy, directly from a current command from a battery controller, and without iterative computation.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a powertrain having a battery system including parallel connected batteries of different chemical types, comprising:

operating the powertrain according to predicted currents of the batteries for the system to output a demanded current, the currents predicted using a backward-looking model of the system which takes into account dynamics of open-circuit voltages and internal impedances of the batteries on states of charge of the batteries based on prior predicted currents of the batteries.

2. The method of claim 1 wherein:
the backward-looking model of the battery system represents power electronics in which a demanded current command for the demanded current is assigned to the batteries.

3. A system for a powertrain including a battery assembly having at least two batteries of different chemical types connected in parallel, the system comprising:
a controller configured to operate the powertrain according to predicted currents of the batteries to a demanded current command for the battery assembly to output a demanded current, and to predict the battery currents directly from the demanded current using a backward-looking model of the battery assembly which takes into account dynamics of open-circuit voltages and internal impedances of the batteries on states of charge of the batteries based on prior predicted currents of the batteries.

4. The system of claim 3 wherein:
the backward-looking model of the battery assembly represents power electronics in which the demanded current command is assigned to the batteries.

5. A powertrain comprising:
a battery system including at least two batteries of different chemical types connected in parallel; and
a controller configured to, in response to a demanded current command for the battery system to output a demanded current:
  use a backward-looking model of the battery system to predict battery responses including open-circuit voltage, internal impedance, and state of charge dynamics of each of the batteries based on prior predicted output currents of the batteries for the battery system to output the demanded current;
  use the predicted battery responses to predict an updated output current of each of the batteries which together provide the demanded current; and
  operate the powertrain according to the predicted updated output currents of the batteries.

6. The powertrain of claim 5 wherein:
the controller is further configured to use the predicted battery responses and the predicted output currents of the batteries to predict an output voltage of the battery system.

7. The powertrain of claim 5 wherein:
the backward-looking model of the battery system represents power electronics in which the demanded current command is assigned to the batteries.

8. The powertrain of claim 5 wherein:
the powertrain is the powertrain of an electric vehicle.

* * * * *